(12) United States Patent
Fennessy et al.

(10) Patent No.: US 11,161,156 B2
(45) Date of Patent: Nov. 2, 2021

(54) POWDER MONITORING

(71) Applicant: Hamilton Sundstrand Corporation, Charlotte, NC (US)

(72) Inventors: Colette O. Fennessy, West Hartford, CT (US); Shawn K. Reynolds, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 184 days.

(21) Appl. No.: 16/510,180

(22) Filed: Jul. 12, 2019

(65) Prior Publication Data
US 2019/0329300 A1 Oct. 31, 2019

Related U.S. Application Data

(60) Continuation-in-part of application No. 16/292,173, filed on Mar. 4, 2019, now abandoned, which is a
(Continued)

(51) Int. Cl.
*B08B 3/10* (2006.01)
*F15D 1/00* (2006.01)
(Continued)

(52) U.S. Cl.
CPC .................. *B08B 3/10* (2013.01); *B08B 3/04* (2013.01); *B08B 9/00* (2013.01); *B29C 64/35* (2017.08);
(Continued)

(58) Field of Classification Search
CPC .... B08B 3/04; B08B 3/10; B08B 3/12; B08B 9/00; B08B 2209/005; B33Y 44/00; B33Y 40/00; F15D 1/00; Y10T 137/0402; Y10T 137/0419; Y10T 137/0424; B65G 47/252; B65G 57/035; B65G 57/10; B65G 57/245; B65G 2203/0283; B65G 2203/0291;
(Continued)

(56) References Cited

U.S. PATENT DOCUMENTS 3,686,926 A * 8/1972 Miller ................ G01N 15/1031
73/61.72
4,546,649 A * 10/1985 Kantor ..................... G01B 7/06
340/870.11
(Continued)

*Primary Examiner* — William M Mccalister
(74) *Attorney, Agent, or Firm* — Locke Lord LLP; Scott D. Wofsy; Georgi Korobanov

(57) ABSTRACT

A method including filling an internal passage of an additively manufactured (AM) article with a state change fluid, causing the state change fluid to change from a first state having a first viscosity to a second state that is either solid or has a second viscosity that is higher than the first viscosity within the internal passage, causing the state change fluid to change back from the second state to the first state, removing residual powder from the additively manufactured article by flushing the state change fluid from the internal passage, measuring electrical impedance of a piezoelectric wafer connected to the additively manufactured article, and determining that more than a threshold amount of residual powder remains within the AM article based on the measured electrical impendence of the additively manufactured article being outside of a selected range from an expected impendence value.

4 Claims, 2 Drawing Sheets

Related U.S. Application Data division of application No. 14/924,046, filed on Oct. 27, 2015, now Pat. No. 10,220,422, application No. 16/510,180, which is a continuation-in-part of application No. 14/924,046, filed on Oct. 27, 2015, now Pat. No. 10,220,422.

(51) Int. Cl.

| | | |
|---|---|---|
| *B08B 9/00* | (2006.01) | |
| *B08B 3/04* | (2006.01) | |
| *B22F 5/10* | (2006.01) | |
| *B22F 3/24* | (2006.01) | |
| *B65G 47/252* | (2006.01) | |
| *B65G 57/10* | (2006.01) | |
| *B65G 57/24* | (2006.01) | |
| *B29C 64/35* | (2017.01) | |
| *B65G 57/03* | (2006.01) | |
| *B08B 3/12* | (2006.01) | |
| *B33Y 40/00* | (2020.01) | |
| *B22F 10/70* | (2021.01) | |

(52) U.S. Cl.
CPC ......... *B65G 47/252* (2013.01); *B65G 57/035* (2013.01); *B65G 57/10* (2013.01); *B65G 57/245* (2013.01); *F15D 1/00* (2013.01); *B08B 3/12* (2013.01); *B08B 2209/005* (2013.01); *B22F 5/10* (2013.01); *B22F 10/70* (2021.01); *B22F 2003/247* (2013.01); *B22F 2999/00* (2013.01); *B33Y 40/00* (2014.12); *B65G 2203/0283* (2013.01); *B65G 2203/0291* (2013.01); *Y02P 10/25* (2015.11)

(58) Field of Classification Search
CPC ............... B22F 5/10; B22F 2003/1059; B22F 2003/241; B22F 2003/247; B22F 2999/00; B22F 10/70; B22F 2203/0283; B22F 2203/0291; B29C 64/35; Y02P 10/25
USPC ................................. 137/15.01, 15.04, 15.05
See application file for complete search history.

(56) References Cited

U.S. PATENT DOCUMENTS

| | | | | |
|---|---|---|---|---|
| 5,340,656 | A * | 8/1994 | Sachs | B29C 67/243 |
| | | | | 428/546 |
| 6,019,332 | A * | 2/2000 | Sweere | A47B 21/00 |
| | | | | 248/280.11 |
| 6,363,606 | B1 * | 4/2002 | Johnson, Jr. | B33Y 10/00 |
| | | | | 29/854 |
| 7,932,726 | B1 * | 4/2011 | Vermeire | H01L 21/67028 |
| | | | | 324/525 |
| 8,828,311 | B2 * | 9/2014 | Medina | B22F 3/115 |
| | | | | 419/2 |
| 9,101,321 | B1 * | 8/2015 | Kieser | A61B 90/39 |
| 9,764,854 | B2 * | 9/2017 | Dobbin | F16B 33/004 |
| 2005/0038520 | A1 * | 2/2005 | Binette | A61F 2/30756 |
| | | | | 623/18.11 |
| 2010/0286654 | A1 * | 11/2010 | Dos Santos | A61F 9/0017 |
| | | | | 604/506 |
| 2010/0293742 | A1 * | 11/2010 | Chung | A47L 9/19 |
| | | | | 15/339 |
| 2012/0310151 | A1 * | 12/2012 | Takahata | A61M 5/44 |
| | | | | 604/58 |
| 2014/0150814 | A1 * | 6/2014 | Peltz | B08B 3/10 |
| | | | | 134/1 |
| 2014/0208950 | A1 * | 7/2014 | Giurgiutiu | G01N 29/2437 |
| | | | | 96/153 |
| 2014/0220173 | A1 * | 8/2014 | Quinonez | B01L 3/502707 |
| | | | | 425/546 |
| 2014/0341675 | A1 * | 11/2014 | Dobbin | F16B 37/14 |
| | | | | 411/82.1 |
| 2015/0060403 | A1 * | 3/2015 | Carter | C22C 1/0491 |
| | | | | 216/53 |
| 2015/0077215 | A1 * | 3/2015 | Ranky | H05K 3/1258 |
| | | | | 338/47 |
| 2015/0102523 | A1 * | 4/2015 | Russell | B28B 7/0091 |
| | | | | 264/255 |
| 2015/0129688 | A1 * | 5/2015 | Buchanan | B23K 26/388 |
| | | | | 239/589 |
| 2015/0157822 | A1 * | 6/2015 | Karpas | B29C 33/52 |
| | | | | 128/206.24 |
| 2015/0184688 | A1 * | 7/2015 | Dobbin | F16B 39/021 |
| | | | | 411/82.1 |
| 2015/0217059 | A1 * | 8/2015 | Ashby | B29C 45/14065 |
| | | | | 604/189 |
| 2015/0275916 | A1 * | 10/2015 | Marshall | F04D 29/563 |
| | | | | 415/148 |
| 2016/0067778 | A1 * | 3/2016 | Liu | B29C 64/273 |
| | | | | 419/53 |
| 2016/0069376 | A1 * | 3/2016 | Dobbin | F16B 37/14 |
| | | | | 411/82.1 |
| 2016/0138641 | A1 * | 5/2016 | Dobbin | B29C 65/08 |
| | | | | 411/377 |
| 2016/0159493 | A1 * | 6/2016 | Dobbin | F16B 33/004 |
| | | | | 411/82.1 |
| 2016/0167312 | A1 * | 6/2016 | Feinberg | A61L 27/24 |
| | | | | 264/239 |
| 2016/0169266 | A1 * | 6/2016 | Dobbin | F16B 37/14 |
| | | | | 411/373 |
| 2016/0206122 | A1 * | 7/2016 | Walter | A47G 19/2211 |
| 2016/0230801 | A1 * | 8/2016 | Dobbin | B64D 45/02 |
| 2016/0244181 | A1 * | 8/2016 | Dobbin | F16B 37/14 |
| 2016/0279868 | A1 * | 9/2016 | Burdick | A61L 27/52 |
| 2016/0333723 | A1 * | 11/2016 | Siebert | G01L 19/0654 |
| 2016/0340050 | A1 * | 11/2016 | Schmidt | F16B 5/01 |
| 2017/0050746 | A1 * | 2/2017 | Dobbin | B21D 39/00 |
| 2017/0113253 | A1 * | 4/2017 | Giulietti | B29C 64/35 |
| 2017/0216915 | A1 * | 8/2017 | Holcomb | B22F 3/105 |
| 2017/0224142 | A1 * | 8/2017 | Darin | B65D 81/38 |
| 2017/0274011 | A1 * | 9/2017 | Garibyan | A61P 17/02 |
| 2017/0297815 | A1 * | 10/2017 | Weng | B65D 88/42 |
| 2017/0307598 | A1 * | 10/2017 | Skardal | B01L 3/5027 |
| 2018/0001086 | A1 * | 1/2018 | Bartholomew | A61N 1/36003 |
| 2018/0021997 | A1 * | 1/2018 | Widmer | B29C 45/14639 |
| | | | | 29/611 |
| 2018/0153644 | A1 * | 6/2018 | Bosisio | A61C 17/0208 |

\* cited by examiner

POWDER MONITORING

CROSS-REFERENCE TO RELATED APPLICATIONS

This application is a Continuation in Part of U.S. patent application Ser. No. 14/924,046 filed Oct. 27, 2015 (issued as U.S. Pat. No. 10,220,422) and U.S. patent application Ser. No. 16/292,173 filed Mar. 5, 2019, the entire contents of which are incorporated herein by reference.

BACKGROUND

Field

The present disclosure relates to additive manufacturing methods and systems, more specifically to methods and systems for powder removal and inspection for additively manufactured articles.

Description of Related Art

Certain methods for additive manufacturing using powder beds (e.g., selective laser sintering) cause powder to be left within internal passages of the additively manufactured article. When components are made in the additive laser powder bed fusion process, residual entrapped powder can remain inside internal cavities and channels. After parts are built using the laser powder bed fusion additive machine, the components left on the build plate need to go through a post-powder removal process. Agitation or vibration methods can be used to remove unsintered powder from additive components. It is imperative that all the unsintered powder is removed from the channels before the components go onto the next steps of the process, specifically heat treatment. Traditionally, computed tomography (CT Scan) can be used to inspection effectiveness of powder removal, but the process is expensive, time consuming, and not necessarily accurate Such conventional methods and systems have generally been considered satisfactory for their intended purpose. However, there is still a need in the art for a technique that can rapidly determine if a part has been completely depowdered following the powder removal process. The present disclosure provides a solution for this need.

SUMMARY

A method includes issuing a state change fluid into an internal passage of an additively manufactured article and causing the state change fluid to change from a first state having a first viscosity to a second state that is either solid or has a second viscosity that is higher than the first viscosity within the internal passage. The method can also include causing the state change fluid to change back from the second state to the first state and flushing the state change fluid from the internal passage to remove residual powder from the additively manufactured article.

The method can include applying vibration, such as ultrasonic vibration, to the additively manufactured article while the state change fluid is in the second state. Causing the state change fluid to change from the first state to the second state can include applying heat to the state change fluid. For example, the state change fluid can include poly (N-isopropylacrylamide) or any other suitable thermal-responsive polymer that becomes more viscous or solidifies with added heat.

Causing the state change fluid to change from the first state to the second state can include cooling the state change fluid. For example, the state change fluid can include an ionic liquid that is crystalline at room temperature and melts to freely flow above room temperature. In certain embodiments, the ionic liquid can include [bmim]NTf$_2$. In such embodiments, the method can further include heating the ionic liquid to change the ionic liquid from the second state to the first state before inputting the ionic liquid into the internal passage.

Causing the state change fluid to change from the first state to the second state can include applying a pressure or force to the state change fluid. For example, the state change fluid can include a non-Newtonian fluid that becomes more viscous or rigid with applied kinetic energy.

Inputting the state change fluid can include applying a pressure to the state change fluid. Causing the state change fluid to change from the first state to the second state can include removing the applied pressure or reducing pressure to the state change fluid. For example, the state change fluid can include a non-Newtonian fluid that flows more freely with higher pressure (e.g., a clay suspension).

In accordance with at least one aspect of this disclosure, an additively manufactured article includes an internal passage, the internal passages being cleared of residual powder by any suitable portion or combination of portions of a method as described above.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
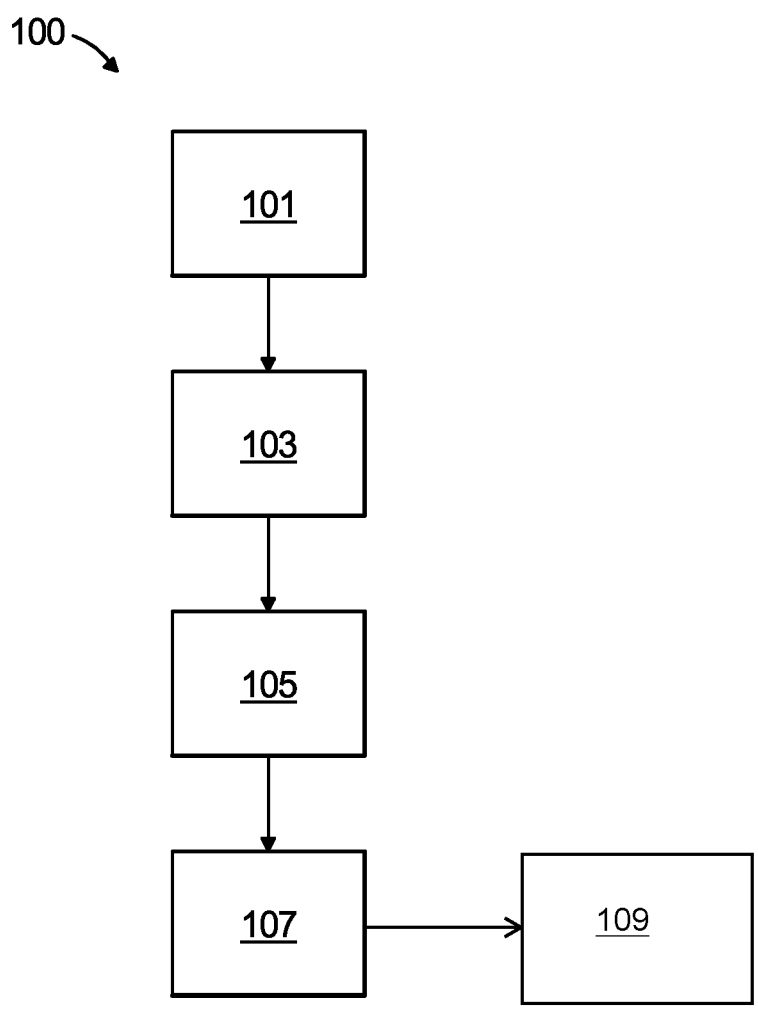
FIG. 1 is a flowchart of an embodiment of a method in accordance with this disclosure.
Figure 2:
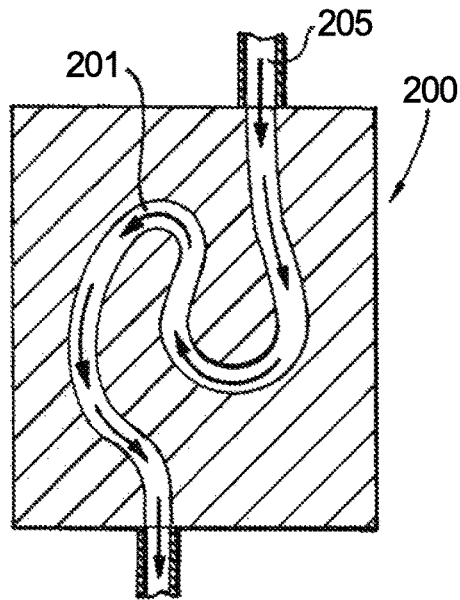
FIG. 2 is a cross-sectional elevation view of an embodiment of an additively manufactured article having an internal flow passage, showing a state change fluid flowing therethrough in a first state.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2-3B. The systems and methods described herein can be used to remove residual powder from within internal passages of additively manufactured articles, for example.

Referring to FIGS. 1 and 2-3B, a method 100 includes inputting (e.g., at block 101) a state change fluid 205 into an internal passage 201 of an additively manufactured article 200. The method 100 also includes causing (e.g., at block 103) the state change fluid 205 to change from a first state having a first viscosity (e.g., as shown in FIG. 2) to a second state that is either solid (e.g., as shown FIG. 3A) or has a second viscosity that is higher than the first viscosity (e.g., as shown in FIG. 3B) while the state change fluid 205 is within the internal passage 201.

The method 100 can also include causing (e.g., at block 105) the state change fluid 205 to change back from the second state (e.g., FIG. 3A and/or FIG. 3B) to the first state (e.g., FIG. 2). After converting back to the first state, the method 100 can include flushing (e.g., at block 107) the state change 205 fluid from the internal passage 201 to remove residual powder from the additively manufactured article 200.

Figure 3A:
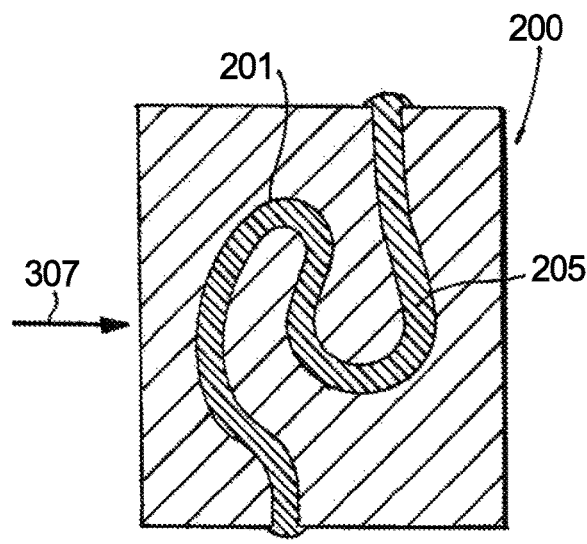
FIG. 3A is a cross-sectional elevation view of an the additively manufactured article of FIG. 2, showing the state change fluid converted to a substantially solid form in an embodiment of a second state in accordance with this disclosure.
Figure 3B:
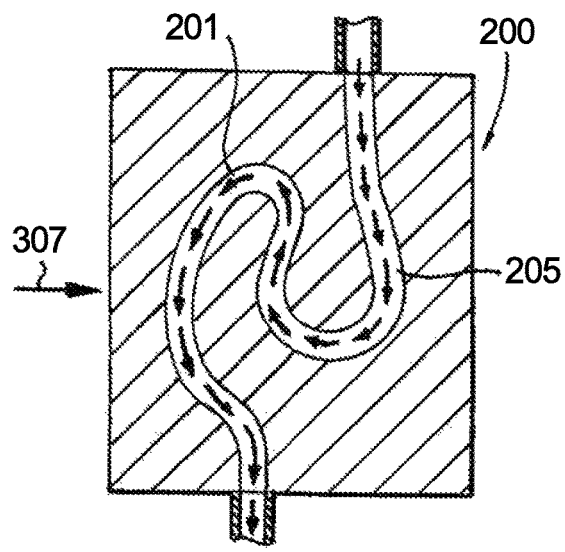
FIG. 3B is a cross-sectional elevation view of an the additively manufactured article of FIG. 2, showing the state change fluid converted to a more viscous state in another embodiment of a second state in accordance with this disclosure.

Referring to FIGS. 3A and 3B, the method 100 can include applying vibration 307 to the additively manufactured article 200 while the state change fluid 205 is in the second state. In certain embodiments, the vibration can be ultrasonic vibration. Any other suitable mode of vibration is contemplated herein and any type of transducer for vibration can be used to vibrate the additively manufactured article 200 and/or the state change fluid 205 within the internal passage 201.

In certain embodiments, causing the state change fluid 205 to change from the first state to the second state can include applying heat to the state change fluid 205. For example, the state change 205 fluid can include poly(N-isopropylacrylamide) or any other suitable thermal-responsive polymer that becomes more viscous and/or solidifies with added heat.

Causing the state change fluid to change 205 from the first state to the second state can include cooling the state change fluid 205. For example, the state change fluid 205 can include an ionic liquid that is crystalline at room temperature and melts to freely flow above room temperature. In certain embodiments, the ionic liquid can include [bmim]NTf$_2$. In such embodiments, the method 100 can further include heating the ionic liquid to change the ionic liquid from the second state to the first state before inputting the ionic liquid into the internal passage 201.

In certain embodiments, causing the state change fluid 205 to change from the first state to the second state includes applying a pressure or force to the state change fluid 205. For example, the state change fluid 205 can include a non-Newtonian fluid that becomes more viscous and/or rigid with applied kinetic energy (e.g., cornstarch in water).

In certain embodiments, inputting the state change fluid 205 includes applying a pressure to the state change fluid 205. Causing the state change fluid 205 to change from the first state to the second state can include removing the applied pressure or reducing pressure to the state change fluid 205. For example, the state change fluid 205 can include a non-Newtonian fluid that flows more freely with higher pressure (e.g., a clay suspension).

In accordance with at least one aspect of this disclosure, an additively manufactured article 200 includes an internal passage 201, the internal passage 201 being cleared of residual powder by any suitable portion or combination of portions of a method 100 as described above.

Embodiments as described above allow for more effective powder removal than traditional methods and systems. Increasing the viscosity of a flushing fluid (e.g., the state change fluid 205) can allow the flushing to be more effective. For example, vibrating the article 200 after changing to a more viscous or solid state translates the vibration energy to powder particles that are stuck inside the internal passage. This increase as energy translation improves particle separation from the internal passage, thereby cleaning out the internal passage better without the need for corrosive or abrasive solutions, which can comprise the integrity of the article 200. This also allows for additive manufacturing design freedom not previously attainable with traditional techniques.

After the article 200 has been cleaned, the article is evaluated 109 using an impedance-based monitoring technique to determine if depowdering is complete. Piezoelectric impedance monitoring 109 is used to make non-destructive evaluation to validate that all the powder has been removed from the additive part. Piezoelectric impedance evaluation 109 is a fast and inexpensive method for evaluations of powder removal within the channels. The impedance-based monitoring system uses an impendence evaluator, such as piezoelectric wafers, as collocated sensors and actuators simultaneously excite the structure of interest and measure the response. The impedance measuring device is connected to the additive part. Once impedance measurements 109 have been acquired, the results are compared against an already verified "clean" additive part or with no residual powder left in channel. The presence of metal powder in the part will alter the damping characteristics and thus alter the measured dynamic response of the part. The expected results can be calculated based the material and material thickness or density, or the expected results can be based on a previously validated exemplary part. If the piezoelectric impedance is measured at a value outside the acceptable range, the build plate and components can go back for continued powder removal, rather than scrapping the parts. Previous methods required a percentage of parts to be destructively measured to prove that the lot of parts was able to be used in service. This method however is costly and does not positively prove that each part is completely free of powder.

The methods and of the present disclosure, as described above and shown in the drawings, provide for additively manufactured articles with superior properties including improved residual powder removal from internal passages therein, and ensuring that residual powder has been removed. While the apparatus and methods of the subject disclosure have been shown and described with reference to embodiments, those skilled in the art will readily appreciate changes and/or modifications may be made thereto without departing from the spirit and scope of the subject disclosure.

What is claimed is:
1. A method, comprising:
    filling an internal passage of an additively manufactured (AM) article with a state change fluid; and
    causing the state change fluid to change from a first state having a first viscosity to a second state that is either solid or has a second viscosity that is higher than the first viscosity within the internal passage;
    causing the state change fluid to change back from the second state to the first state;
    removing residual powder from the additively manufactured article by flushing the state change fluid from the internal passage;

measuring electrical impedance of a piezoelectric wafer connected to the additively manufactured article; and determining that more than a threshold amount of residual powder remains within the AM article based on the measured electrical impendence of the additively manufactured article being outside of a selected range from an expected impendence value.

2. The method of claim 1, further comprising evaluating a dynamic response as compared to the expected value.

3. The method of claim 1, wherein the additively manufactured article (AM) is placed in service if the measured impedance of the additively manufactured article (AM) is within the acceptable range.

4. The method of claim 1, wherein the expected value is based on an electrical impedance of a clean part.

* * * * *